US007678495B2

(12) United States Patent
Kolodner et al.

(10) Patent No.: US 7,678,495 B2
(45) Date of Patent: Mar. 16, 2010

(54) GRAPHITIC NANOSTRUCTURED BATTERY

(75) Inventors: Paul Robert Kolodner, Hoboken, NJ (US); Thomas Nikita Krupenkine, Warren, NJ (US); Alan Michael Lyons, Malahide (IE); Stanley Pau, Hoboken, NJ (US); Joseph Ashley Taylor, Springfield, NJ (US); Brijesh Vyas, Warren, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1175 days.

(21) Appl. No.: 11/047,136

(22) Filed: Jan. 31, 2005

(65) Prior Publication Data

US 2006/0172189 A1 Aug. 3, 2006

(51) Int. Cl.
*H01M 2/38* (2006.01)
*H01M 2/14* (2006.01)
*H01M 4/02* (2006.01)
*H01M 4/96* (2006.01)

(52) U.S. Cl. .................. 429/129; 429/50; 429/51; 429/208; 429/231.8

(58) Field of Classification Search ............ None
See application file for complete search history.

(56) References Cited

U.S. PATENT DOCUMENTS

| 4,106,279 | A | * | 8/1978 | Martin et al. ............ 368/64 |
| 4,569,575 | A | | 2/1986 | Le Pesant et al. ......... 350/355 |
| 4,749,198 | A | | 6/1988 | Brailean ................ 273/416 |
| 6,185,961 | B1 | | 2/2001 | Tonucci et al. ........... 65/60.4 |
| 6,231,744 | B1 | | 5/2001 | Ying et al. .............. 205/324 |
| 6,911,280 | B1 | * | 6/2005 | De Jonghe et al. ......... 429/137 |

FOREIGN PATENT DOCUMENTS

| EP | 1 120 164 A2 | 8/2001 |
| WO | WO 02/101352 | 12/2002 |
| WO | WO 03/103835 A1 | 12/2003 |

OTHER PUBLICATIONS

Ranganathan et al. (Srikanth Ranganathan, Richard McCreery, Sree Mouli Majji, and Marc Madou, Photoresist-Derived Carbon for Microelectromechanical Systems and Electrochemical Applications, Journal of The Electrochemical Society, 2000, vol. 147 (1), pp. 277-282).*

(Continued)

*Primary Examiner*—Dah-Wei D Yuan
*Assistant Examiner*—Katherine Turner
(74) *Attorney, Agent, or Firm*—The Law Office of Jay M. Brown (57) ABSTRACT

A method and apparatus are disclosed wherein a battery comprises at least one electrode formed from a graphitic carbon nanostructured surface wherein the nanostructured surface consists of a plurality of nanoposts formed from graphitic carbon such that the graphitic nanoposts serve both as an operational feature (i.e., dielectric/electrode) and control feature of the battery itself. In one embodiment, the nanostructured surface consists of a plurality of nanoposts wherein a select portion of each nanopost is formed to serve as the dielectric of the nanostructured battery, and the balance of each nanopost is utilized to impart the control features to the nanostructured battery.

25 Claims, 7 Drawing Sheets

OTHER PUBLICATIONS

Kinoshita et al. (K. Kinoshita, X. Song, J. Kim, M. Inaba, Development of a carbon-based lithium microbattery, Journal of Power Sources, 1999, vol. 81-82, pp. 170-175).*

U.S. Appl. No. 10/716,084, filed Nov. 18, 2003, Kroupenkine et al.

U.S. Appl. No. 10/403,159, filed Mar. 31, 2003, Kornblit et al.

Lyons, A.M., et al., "Direct Writing of Carbon Interconnections," Mat. Res. Soc. Symp. Proc., vol. 101, Material Research Society, pp. 67-73, 1988.

Lyons, A.M., "Photodefinable Carbon Films Electrical Properties," Journal of Non-Crystalline Solds, vol. 70, pp. 99-109, Elsevier Science Publishers B.V., 1985.

Lyons, A.M., et al., "Thin Pinhole-Free Carbon Films," Thin Solid Films, vol. 103, pp. 333-341, Elsevier Sequoia, 1983.

Zheng, Tao, et al., "Effect of turbostratic disorder in graphitic carbon hosts on the intercalation of lithium," Physical Review B, The American Physical Society, vol. 51, No. 2, Jan. 1, 1995.

Wang, C., et al., "C-MEMS Technology for Li Ion Microbatteries," Abs. 445, 206th Meeting, The Electrochemical Society, Inc., 1 page, 2004.

Wang, C., et al., "C-MEMS/CNTs Electrode Arrays for 3D Microbatteries," 1 page.

Kim, J.-S., et al., "The Electrical and Electrochemical Properties of Poly(p-phenylene)-based Carbon for Lithium Rechargeable Batteries," IEEE, Proceedings of the 5th International Conference on Properties and Applications of Dielectric Materials, pp. 701-704, May 25-30, 1997, Seoul, Korea.

Wang, C., et al., "C-MEMS for the Manufacture of 3D Microbatteries," The Electrochemical Society, Electrochemical and Solid-State Letters, vol. 7, No. 11, pp. A435-A438, 2004.

Wang, C., et al., "C, Ni, and Si Nanoscale Material Formation by C-MEMS/NEMS technology," Abs. 190, 206th Meeting, The Electrochemical Society, Inc., 2004.

Konovalov, V.V., et al., "Water Transport in non-aqueous electrolytes associated with ion transport and intercalation," Material Methods LLC, 1 page, University of California, CA.

Lyons, A.M., et al., "Photodefinable carbon films: Control of image quality," The American Vacuum Society, J. Vac. Sci. Technol. B vol. 3, No. 1, pp. 447452, Jan./Feb. 1985.

Giles, J., "Plastic heralds next-generation batteries," Nature, Nature News Service/Macmillan Magazines Ltd, http://www.nature.com/nsu/040216/040216-5.html, 2 pages, 2004.

Washizu, M., "Electrostatic Actuation of Liquid Droplets for Microreactor Applications," IEEE Transactions on Industry Applications, vol. 34, No. 4, Jul./Aug. 1998.

U.S. Appl. No. 10/798,064, filed Mar. 11, 2004, Arney, et al.

U.S. Appl. No. 10/806,543, filed Mar. 23, 2004, Arney, et al.

U.S. Appl. No. 10/816,659, filed Apr. 1, 2004, Gasparyan, et al.

U.S. Appl. No. 10/674,448, filed Sep. 30, 2003, Hodes, et al.

U.S. Appl. No. 10/803,565, filed Mar. 18, 2004, Hodes, et al.

U.S. Appl. No. 10/803,641, filed Mar. 18, 2004, Hodes et al.

U.S. Appl. No. 10/403,159, filed Mar. 31, 2003, Kornblit, et al.

U.S. Appl. No. 10/649,285, filed Aug. 27, 2003, Kornblit, et al.

U.S. Appl. No. 10/716,084, filed Nov. 18, 2003, Kroupenkine, et al.

U.S. Appl. No. 10/803,576, filed Mar. 18, 2004, Kroupenkine, et al.

U.S. Appl. No. 10/810,774, filed Mar. 26, 2004, Kroupenkine, et al.

Kim, et al., "Nanostructured Surfaces for Dramatic Reduction of Flow Resistance in Droplet-Based Microfluidics," IEEE, pp. 479-482, (2002.

European Search Report dated Mar. 16, 2005.

* cited by examiner

- 510 APPLY PRECURSOR FILM(s) AND APPLY PHOTORESIST
- 520 EXPOSE AND DEVELOP RESIST
- 530 TRANSFER IMAGE
- 540 PYROLYZE APPLIED FILM(s)
- 550 OXIDIZE TIPS

GRAPHITIC NANOSTRUCTURED BATTERY

FIELD OF THE INVENTION

The present invention relates generally to batteries and, more particularly, to microbatteries formed using graphitic nanostructures.

BACKGROUND OF THE INVENTION

Figure 1:
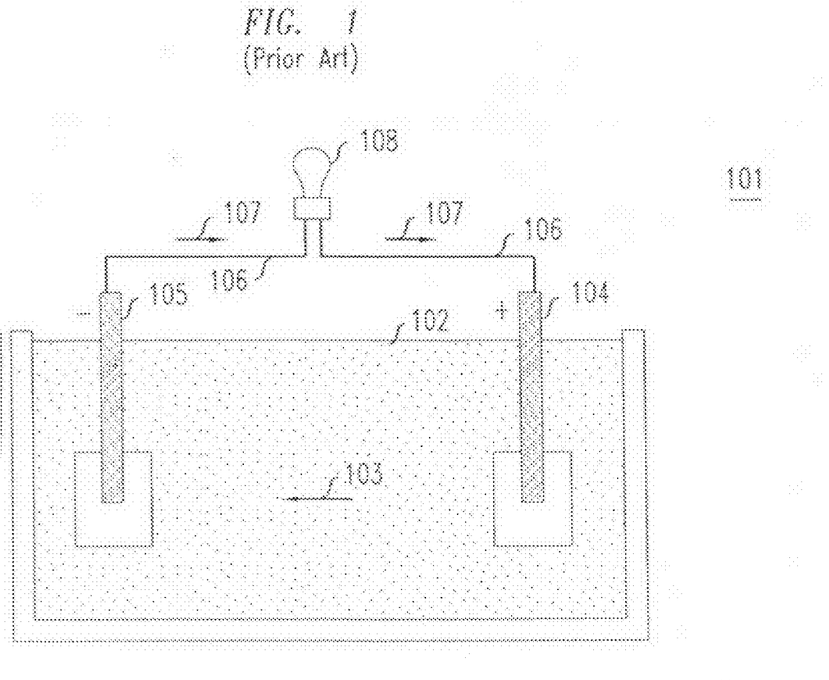
FIG. 1 shows a prior art liquid-cell battery as used in an electrical circuit.

Many beneficial devices or structures in a myriad of applications rely on batteries as a power source. As shown in FIG. 1, illustrative liquid-cell battery 101, is characterized by an electrolyte liquid 102 which provides a mechanism for an electrical charge to flow in direction 103 between a positive electrode 104 and a negative electrode 105. When battery 101 is inserted into an electrical circuit 106 with illustrative load 108, it completes a loop which allows electrons to flow uniformly in direction 107 around the circuit 106. The positive electrode thus receives electrons from the electrical circuit 106. These electrons then react with the materials of the positive electrode 104 in reduction reactions that generate the flow of a charge to the negative electrode 105 via ions in the electrolyte liquid 102. At the negative electrode 105, oxidation reactions between the materials of the negative electrode 104 and the charge flowing through the electrolyte fluid 102 result in surplus electrons that are released to the electrical circuit 106.

As the above process continues, the active materials of the positive and negative electrodes 104 and 105, respectively, eventually become depleted and the reactions slow down until the battery is no longer capable of supplying electrons. At this point the battery is discharged. It is well-known that, even when a liquid-cell battery is not inserted into an electrical circuit, there is often a low level reaction with the electrodes 104 and 105 that can eventually deplete the material of the electrodes. Thus, a battery can become depleted over a period of time even when it is not in active use in an electrical circuit. This period of time will vary depending on the electrolyte fluid used and the materials of the electrodes.

Batteries having at least one nanostructured surface have been recently proposed wherein nanostructures are used to separate the electrolyte from the electrode, by employing certain so-called electrowetting principles, until such a time that the battery is to be used. An example of the use of electrowetting principles applied to batteries is described in copending U.S. patent application Ser. No. 10/716,084 filed on Nov. 18, 2003 (hereinafter the "'084 Application") and entitled "Electrowetting Battery Having Nanostructured Surface," which is hereby incorporated by reference herein. As disclosed in the '084 Application, when it is desired that the battery generate a charge, the electrolyte is caused to penetrate the nanostructured surface and to come into contact with the electrode of the battery, thus resulting in the above-discussed flow of electrons around a circuit. Such a penetration of nanostructures is achieved, for example, by applying a voltage between the nanostructures and the electrolyte such that the contact angle of the electrolyte relative to the nanostructured surface is decreased. When the -contact angle is decreased, the electrolyte penetrates the nanostructures and is brought into contact with the electrode.

Thus, nanostructured batteries (also known as "microbatteries") offer distinct advantages over prior art liquid-cell batteries, for example, in terms of performance and may hold further advantages in terms of battery type and application. For example, lithium (Li) ion batteries are well-known battery components which supply power to a number of electronic devices (e.g., mobile telephones, cameras and laptop computers, to name just a few). As is well understood, lithium ion batteries generate current due to the flow of lithium ions between battery electrodes.

As is also well-known, carbon serves as an excellent electrode material for batteries. In particular, depending upon the crystalline structure of the carbon such material serves at least two different functions: (1) so-called "glassy carbon" which is characterized by $sp^2$ type chemical bonding (where each carbon atom is bonded to three other carbons as in crystalline graphite) but has no long-range graphitic crystal structure. For example, well-known phenol-formaldehyde (novalac) photoresist patterns form glassy carbon patterns, which can serve as a current collector electrode due to electrically conductive and relatively chemically inert properties; and (2) so-called "turbostratic carbon" which is characterized by a random orientation of graphitic domains, the term "turbostratic" indicating a type of crystalline structure where the basal planes have slipped sideways relative to each other, causing the spacing between planes to be greater than ideal. As is well-known, graphitic domains intercalate lithium ions thereby serving as an excellent electrode material for lithium ion batteries. Such graphitic domains of carbon may be formed, as is well understood, from thermal decomposition of certain polymer materials such as poly(acrylonitrile) and poly (p-phenelyene).

Carbon exhibits different properties in a solid state as a function of the type of bonding between individual carbon atoms. For example, diamond and graphite are well-known carbon structures exhibiting different material properties. In diamond, each carbon atom is bonded to four other carbon atoms, such that each carbon is centered in a tetrahedron and surrounded by four carbon atoms located at the vertices. To establish these four equivalent bonds, the electrons in the "s" and "p" orbitals hybridize thereby forming $sp^3$ bonds. In contrast, graphite consists of planar sheets of carbon atoms configured in a hexagonal array where each carbon atom is bonded to three other carbons through $sp^2$ hybridization of orbitals. This type of bonding creates mechanically soft and electrically conductive materials (as contrasted with diamond, as discussed above, which forms a mechanically hard and electrically insulating material). In addition, the space between carbon sheets is relatively large, thereby enabling intercalation of other elements (e.g., lithium).

In the case where planar sheets of carbon atoms extend over long distance (i.e., greater than 1000's of atoms), the materials are considered crystalline. In glassy carbon materials, only the nearest neighbors may be co-planar. Between crystalline graphite and glassy carbon, lie a range of morphologies where the size of the planar, $sp^3$ bonded, domains varies. For example, turbostratic graphite is a known material where the sheet size is relatively small (greater than 5 nanometers). In terms of lithium battery applications, depending upon the degree of order in the sheets they may be layered in a manner that is random with respect to both translation as well as rotation (see, for example, T. Zheng et al., "Effect of turbostratic disorder in graphitic carbon hosts on the intercalation of lithium", in *The American Physical Society*, Physical Review B, Volume 51, Number 2, January 1995, which is hereby incorporated by reference herein (hereinafter "Zheng")). In Zheng, supra, it is shown that the ordering of turbostratic carbon layers is essential for achieving significant lithium intercalation. Further, Zheng has correlated lithium ion battery performance (i.e., capacity) with ordered layer stacking within turbostratic carbon domains.

Additional work, for example, by C. Wang et al., "C-MEMS Technology for Li Ion Microbatteries", in *The*

*Electromechanical Society*, Inc., Abs. 445, 206th Meeting, 2004, which is hereby incorporated by reference herein (hereinafter "Wang"), explores the use of glassy carbons in the formation of lithium ion batteries. In Wang, supra, a technique is described which forms carbon patterns from pyrolysis of certain commercially available photoresist materials such as SU-8. As is well-known, SU-8 is based on a resin available from Shell Chemical, Epikote 157, CAS#28906-96-9, which is a bisphenol-A based multi-functional array. As such, as will be well understood, the various material properties of such a resin allow for the formation of a glassy polymer that, in turn, form glassy, amorphous carbon upon pyrolysis. Wang employs such properties to fabricate and characterize completed microbatteries with posts of C-MEMS doped with lithium for anodes and dodecylbenzenesulfonate-doped poly(pyrrole) (PPYDBS) for cathodes. Wang claims advantages such as an increase in the total available surface area for intercalation by using high aspect ratio posts, and creation of posts directly using a photosensitive precursor to carbon. However, despite such advantages, the efficiency of microbatteries based on intercalating lithium into glassy carbon is relatively low.

Therefore, the availability of graphitic nanostructured batteries which can be used to deliver more efficient (for example, in terms of power, size and life) lithium microbatteries would be advantageous.

SUMMARY OF THE INVENTION

Accordingly, we have realized that it would be extremely advantageous to fabricate a nanobattery having a graphitic nanostructure, for example, a graphitic nanostructured lithium ion battery.

The present invention provides a method and apparatus wherein a battery comprises electrodes formed from a graphitic carbon nanostructured surface. In accordance with an aspect of the invention, the nanostructured surface consists of a plurality of nanoposts formed from graphitic carbon (in accordance with the preferred embodiment graphitic turbostratic carbon) through the use of a pyrolyzed polymer, wherein the graphitic nanoposts serve to deliver both an operational feature (i.e., dielectric/electrode) and a control feature of the nanostructured battery itself. In a further embodiment of the invention, the nanostructured surface consists of a plurality of graphitic carbon nanoposts wherein a select portion (e.g., a top portion) of each nanopost is formed to serve as the dielectric of the nanostructured battery, and the balance of each nanopost (e.g., a bottom portion) is utilized to impart the control features to the nanostructured battery.

Thus, in accordance with the various aspects of the invention, the graphitic nanostructure serves to both deliver an operational feature (i.e., dielectric/electrode) and a control feature of the battery itself. More particularly, with respect to the control feature each nanopost of the graphitic nanostructured surface is disposed in a way such that an electrolyte fluid of the battery is prevented from contacting the electrode, thus preventing discharge of the battery when the battery is not in use. When a voltage is passed over the nanostructured surface, the electrolyte fluid is caused to penetrate the nanostructured surface and to contact the electrode, thus activating the battery. Accordingly, when the activated battery is inserted into an electrical circuit, electrons will flow along the circuit. Advantageously, in addition to forming the battery's electrode, the graphitic nanostructures of the present invention also allow for the control of the graphitic nanostructured battery thereby improving overall battery performance and battery life.

These and other objects, features and advantages of the present invention will become apparent to those of ordinary skill in the art from the following detailed description of illustrative embodiments thereof, which is to be read in connection with the accompanying drawings.

DETAILED DESCRIPTION

As used herein, unless otherwise specified, a "nanostructure" is a predefined structure having at least one dimension of less than one micrometer. The term "feature pattern" refers to a pattern of nanostructures. The terms "liquid," "droplet," and "liquid droplet" are used herein interchangeably. Each of those terms refers to a liquid or a portion of liquid, whether in droplet form or not. The term "graphitic" refers to a three dimensionally ordered array of carbon atoms with planar sheets of hexagonally arrayed atoms stacked in a defined, repeating pattern.

Figure 2:
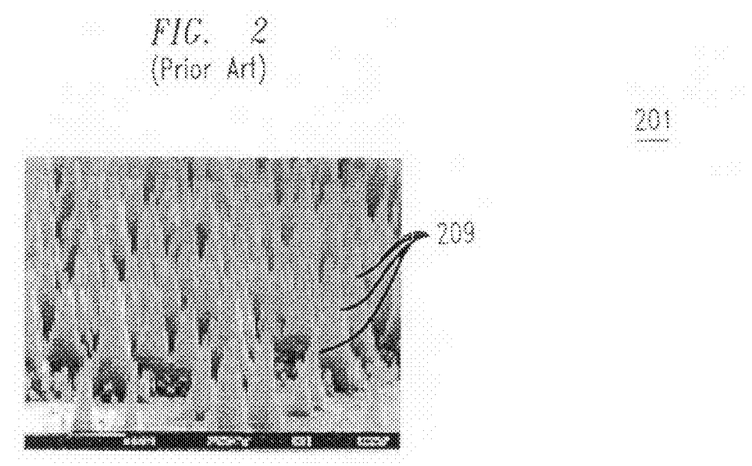
FIG. 2 shows a prior art nanopost surface.

To better facilitate an understanding of the present invention, a brief discussion on nanostructured surfaces follows. FIG. 2 shows an illustrative nanopost pattern 201 with each nanopost 209 having a diameter of less than 1 micrometer. While FIG. 2 shows nanoposts 209 formed in a somewhat conical shape, other shapes and sizes are also achievable. In fact, cylindrical nanopost arrays have been produced with each nanopost having a diameter of less than 10 nm. Specifically, FIGS. 3A-3E show different illustrative arrangements of nanoposts produced using various methods and further show that such various diameter nanoposts can be fashioned with different degrees of regularity. Moreover, these Figures show that it is possible to produce nanoposts having various diameters separated by various distances. An illustrative method of producing nanoposts, found in U.S. Pat. No. 6,185,961, entitled "Nanopost arrays and process for making same," issued Feb. 13, 2001 to Tonucci, et al, is hereby incorporated by reference herein in its entirety. Nanoposts have been manufactured by various methods, such as by using a template to form the posts, by various means of lithography, and by various methods of etching.

Figure 3A:
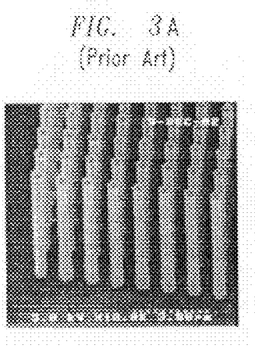
FIGS. 3A, 3B, 3C, 3D and 3E show various prior art nanostructure feature patterns of predefined nanostructures that are suitable for use in the present invention.
Figure 3B:
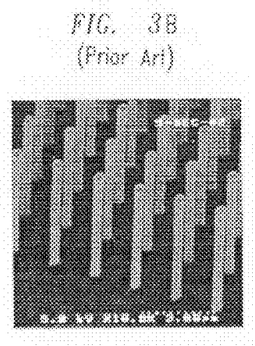
Figure 3C:
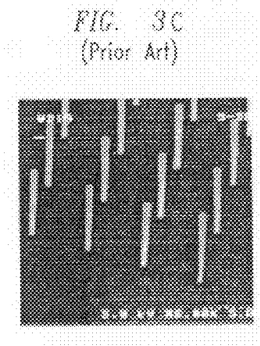
Figure 3D:
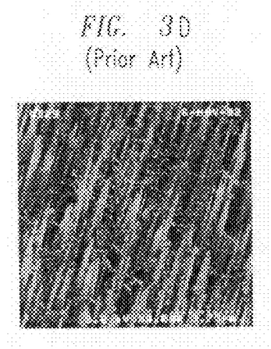
Figure 3E:
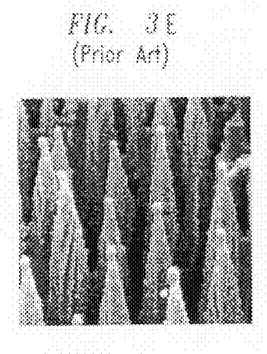
Figure 4:
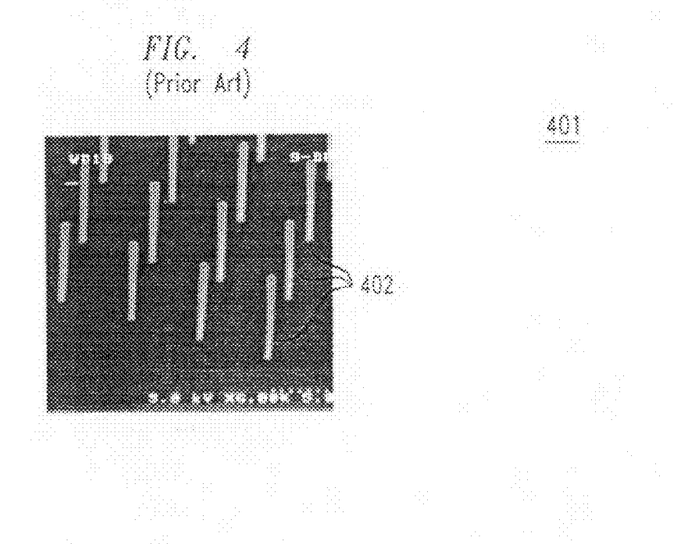
FIG. 4 shows a further detailed view of the prior art nanostructure feature pattern of FIG. 3C.

FIG. 4 shows the illustrative known surface 401 of FIG. 3C with a nanostructure feature pattern of nanoposts 402 disposed on a substrate. Throughout the description herein, one skilled in the art will recognize that the same principles applied to the use of nanoposts or nanostructures can be equally applied to microposts or other larger features in a feature pattern. The surface 401 and the nanoposts 402 of FIG. 4 are, illustratively, made from silicon. The illustrative nanoposts 402 of FIG. 4 are approximately 350 nm in diameter, approximately 6 μm high and are spaced approximately 4 μm apart, center to center. It will be obvious to one skilled in the art that such arrays may be produced with regular spacing or, alternatively, with irregular spacing.

As discussed above, the present Applicants have recognized that nanostructured surfaces can be used to deliver a battery having an electrode formed from a graphitic carbon nanostructured surface (i.e., an operational feature) and that such nanostructured surface can also serve to impart certain control features to the battery. In one illustrative embodiment of the invention, the nanostructured surface consists of a plurality of graphitic carbon nanoposts formed from graphitic carbon through the use of a pyrolyzed polymer whereby such graphitic nanoposts serve as the electrode of the nanostructured battery and also serve to control certain aspects of the nanostructured battery itself. In a further embodiment of the invention, the nanostructured surface consists of a plurality of nanoposts wherein a select portion of each nanopost (e.g., a top portion) is formed to serve as the dielectric of the nanostructured battery, and the balance of each nanopost (e.g., a bottom portion) is utilized to impart the control features to the nanostructured battery.

Again, in accordance with the various illustrative embodiments of the invention, the graphitic nanostructure serves both as an operational feature (i.e., dielectric/electrode) and control feature of the battery itself, as further discussed hereinbelow.

Significantly, the various principles of the present invention provide at least the following new improvements and distinguished features from prior lithium ion microbatteries (see, for example, Wang, supra): (1) in accordance with present invention, posts are created directly using a photosensitive precursor to carbon which yields a turbostratic carbon, i.e., a graphitic form of carbon that intercalates lithium ions significantly more efficiently than glassy carbon; (2) in accordance with present invention, the turbostratic carbon electrode is incorporated into the microbattery such that the electrode is isolated from the electrolyte until the microbattery is activated, such isolation being achieved by forming dielectric layers and hydrophobic layers on top of the graphitic nanoposts; (3) in accordance with present invention, by using separate photoresist and carbon precursor layers the graphitic nanopost arrays exhibit greater surface area; and (4) in view of the aforementioned (1)-(3), the graphitic nanostructures, in accordance with the principles of the present invention, serve both as an operational feature (i.e., form the dielectric/electrode) and control feature (i.e., electrolyte isolation and battery activation) of the microbattery itself.

Figure 5:
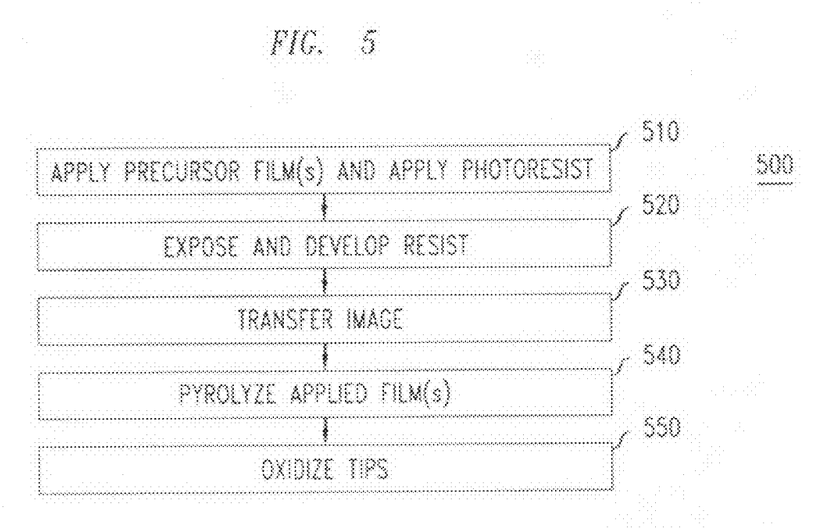
FIG. 5 shows a flowchart of illustrative operations for fabricating a graphitic nanostructured surface in accordance with the principles of the present invention.
Figure 6:
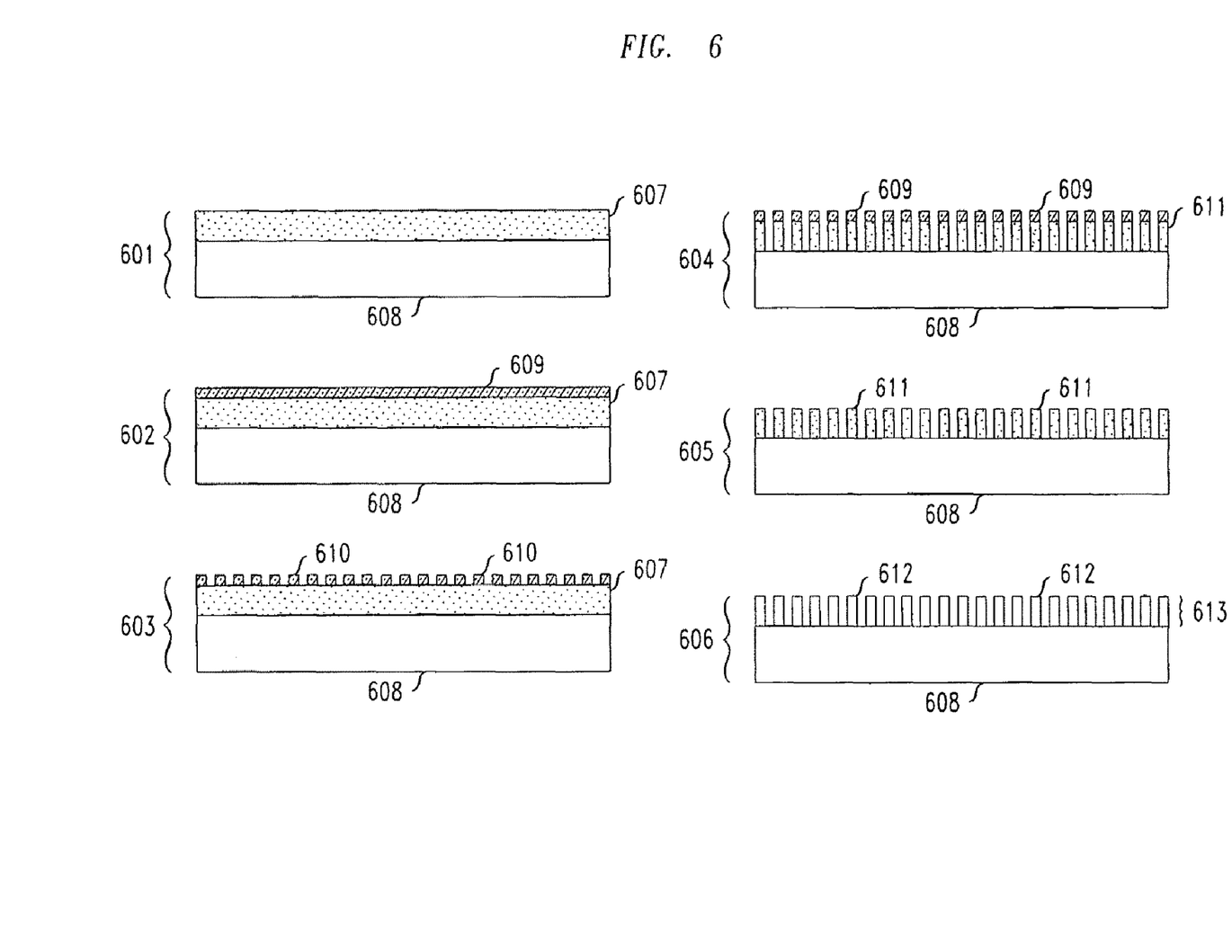
FIG. 6 shows illustrative graphitic nanostructured surfaces fabricated in accordance with the illustrative operations of FIG. 5.

FIG. 5 shows a flowchart of illustrative operations 500 for fabricating a graphitic nanostructured surface in accordance with the principles of the present invention. In accordance with an embodiment of the invention, a precursor film (or films) is applied to a substrate and, thereafter, a photoresist is applied on top of the film/substrate combination (block 510). As will be appreciated, the precursor film(s) is selected based on having certain properties which will allow for the formation of graphitic carbon. Thus, in accordance with an embodiment of the invention, the precursor material is a polymer film such as well-known poly(acrylonitrile), also referred to in the art as "PAN". As will be appreciated, any number of polymer films will serve equally well to form the graphitic nanostructured surface of the present invention including, but not limited to, poly(p-phenylene) and polyimide. The illustrative results of operation 510 are shown in FIG. 6 in structure 601 (this structure 601 and others 602-606 shown in cross-sectional view). As shown in structure 601, polymer film 607 has been applied to substrate 608, illustratively a silicon substrate. Structure 602 in FIG. 6 shows the further application of photoresist 609 on top of polymer film 607.

In accordance with this embodiment of the invention, photoresist 609 is exposed and developed (see, FIG. 5, block 520) using standard semiconductor processing techniques which will be well understood by those skilled in the art and need not be delineated further herein. As will also be appreciated, photoresist 609 can be any number of well-known photoresists such as AZ 4620 which contains cresol-novolak resin (commercially available from the Clariant Corporation, 400 Monroe Road, Charlotte, N.C. 28205) which, in terms of the present invention, are selected based on properties such as good image quality, high photosensitivity, and etchant resistance. Structure 603 of FIG. 6 shows the resultant pattern 610 which is then used to transfer the desired image (see, FIG. 5, block 530), again using well-known semiconductor photolithographic techniques, onto substrate 608 as shown in structure 604. As seen in structure 604, nanoposts 611 appear on the surface of substrate 608 with each nanopost 611 having a small section of photoresist 609 left from the image transferal operation. Such photoresist is stripped in a well-known fashion as shown in structure 605 which shows nanoposts 611 on the surface of substrate 608 free of any further photoresist materials.

In accordance with this embodiment of the invention, the applied polymer materials are pyrolized (see, FIG. 5, block 540) which results in the graphitic nanostructure of the present invention, which is illustratively shown in structure 606 having graphitic nanostructure 613 consisting of graphitic carbon nanoposts 612. As will be appreciated by those skilled in the art, pyrolysis is the decomposition or transformation of a compound caused by heat in the absence of oxygen. In accordance with embodiment of the invention, after the applied polymer is pyrolized, the graphitic carbon nanoposts 612 are treated with a hydrophobic dielectric coating (such as CYTOP®, a soluble fluropolymer commercially available from Asahi Kasei Chemical Corporation, 1-2 Yuraku-cho, 1-chome, Chiyoda-ku, Tokyo, Japan; or Bellex International Corp., 501 Carr Road, Suite 100, Wilmington, Del. 19809). Selective coating of the tips can be achieved by dipping the graphitic nanostructures into an uncured film of the polymer. By maintaining a small thickness of the hydrophobic dielectric coating (preferably less than 1 micron), most of the post remains uncoated and available to intercalate lithium. Coating the tips imparts the desired dielectric properties, as well as superhydrophobic properties, to graphitic carbon nanoposts 612 thereby forming the electrode of the graphitic nanostructured battery, in accordance with the principles of the invention.

In accordance with a further embodiment of the invention, the nanostructured surface consists of a plurality of nanoposts wherein a select portion of each nanopost is formed to serve as the dielectric of the nanostructured battery, and the balance of each nanopost is utilized to impart certain control features to the nanostructured battery. More particularly, the bottom portion of each nanopost of the nanostructured surface is disposed in a way such that an electrolyte fluid of the battery is prevented from contacting the electrode, thus preventing discharge of the battery when the battery is not in use. When a voltage is applied to the nanostructured surface, the electrolyte fluid is caused to penetrate the nanostructured surface and to contact the electrode, thus activating the battery. Accordingly, when the activated battery is inserted into an electrical circuit, electrons will flow along the circuit. That is, in accordance with the various illustrative embodiments of the invention, the graphitic nanostructure (i.e., the graphitic nanoposts) serves both as an operational feature (i.e., dielectric/electrode) and control feature of the battery itself.

Figure 7A:
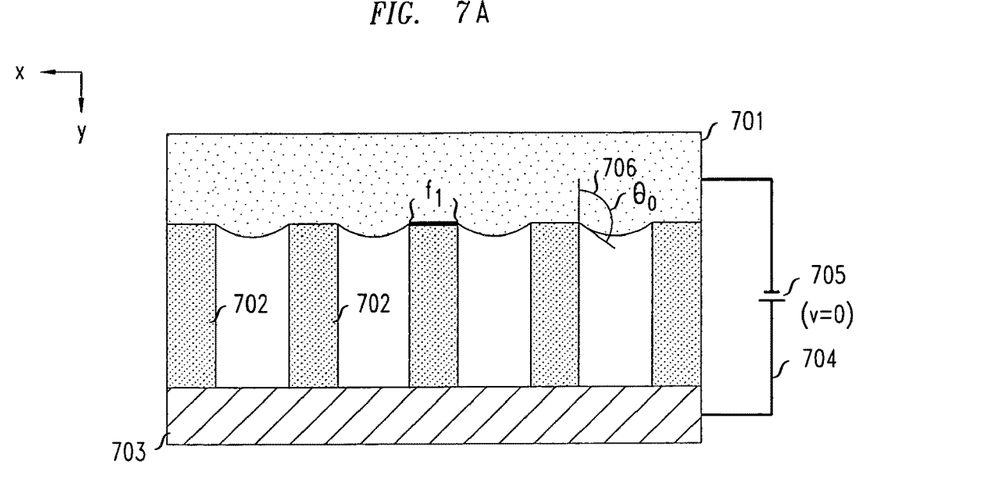
FIGS. 7A and 7B show the operational and control features of the present invention in an illustrative graphitic nanostructured battery.
Figure 7B:
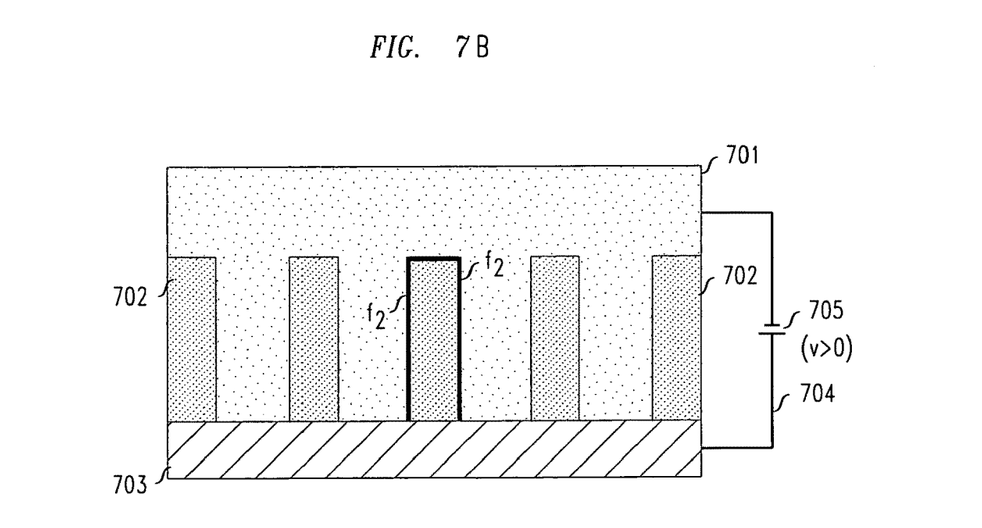

In terms of the above-described control features of the graphitic nanopost structure of the present invention, FIGS. 7A and 7B show the illustrative control features whereby electrowetting principles are used to cause a liquid droplet to penetrate the graphitic nanostructured pattern. In addition to the description in the '084 Application, electrowetting principles are generally described in U.S. patent application Ser. No. 10/403,159, filed Mar. 31, 2003, and titled "Method And Apparatus For Variably Controlling The Movement Of A Liquid On A Nanostructured Surface," which is hereby incorporated by reference herein.

Referring to FIG. 7A, a droplet 701 of conducting liquid (such as an electrolyte solution) is disposed on nanostructure feature pattern of cylindrical nanoposts 702, such nanoposts being graphitic nanopost structures as described above in accordance with the invention, such that the surface tension of the droplet 701 results in the droplet being suspended on the upper portion of the nanoposts 702. In this arrangement, the droplet only covers surface area $f_1$ of each nanopost. The nanoposts 702 are supported by the surface of a conducting substrate 703. Droplet 701 is illustratively electrically connected to substrate 703 via lead 704 having voltage source 705. Nanoposts 702 are electrically insulated from the liquid 701 by an insulating layer of dielectric material. The nanoposts are further separated from the liquid by a low surface energy material such as a well-known fluoro-polymer. Such a low surface energy material allows one to obtain an appropriate initial contact angle 706 between the liquid and the surface of the nanopost. It will be obvious to one skilled in the art that, instead of using two separate layers of different material, a single layer of material that possesses sufficiently low surface energy and sufficiently high insulating properties could be used.

FIG. 7B shows that, by applying a low voltage (e.g., 10 to 20 volts) to the conducting droplet of liquid 701, a voltage difference results between the liquid 701 and the nanoposts 702. The contact angle between the liquid and the surface of the nanopost decreases and, at a sufficiently low contact angle, the droplet 701 moves down in the y-direction along the surface of the nanoposts 702 and penetrates the nanostructure feature pattern until it completely surrounds each of the nanoposts 702 and comes into contact with the upper surface of substrate 703. In this configuration, the droplet covers surface area $f_2$ of each nanopost. Since $f_2 \gg f_1$, the overall contact area between the droplet 701 and the nanoposts 702 is relatively high such that the droplet 701 contacts the substrate 703.

Figure 8:
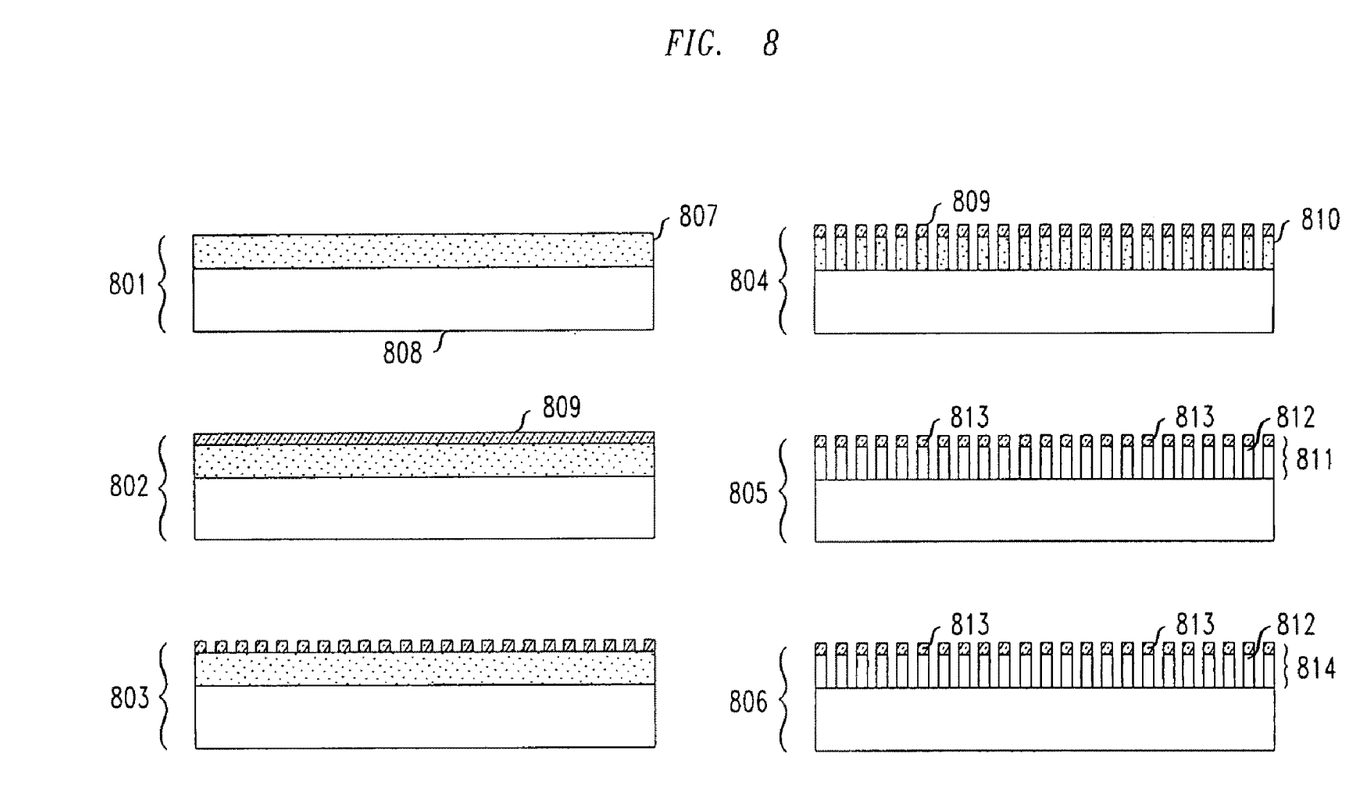
FIG. 8 shows illustrative graphitic nanostructured surfaces having select dielectric tips fabricated in accordance with the illustrative operations of FIG. 5.

FIG. 8 shows illustrative graphitic nanostructured surfaces having select dielectric tips fabricated in accordance with the illustrative operations of FIG. 5 and this further embodiment of the invention. As shown in FIG. 8, structures 801 through 804 (fabricated from the combination of polymer film 807/substrate 808) have similar characteristics as structures 601 through 604 as shown in FIG. 6. As such, the details of such structures will not be repeated here again (including the relevant operations from FIG. 5 as also previously discussed above). However, in accordance with this further embodiment of the invention, photoresist 809, as shown in structure 802, is selected based on such photoresist containing an additional element (e.g., silicon) which will thermally decompose to form a dielectric. Photoresists exhibiting such properties are known as "bi-level" resists, such as poly(vinylmethylsiloxane, bis(4-chloromethyl phenyl) siloxane and diazo-siloxane. Thus, in accordance with this embodiment of the invention, the photoresist 809 which remains patterned on top of nanoposts 810, as shown in structure 804, will be used to form the electrode of the nanostructured battery. After pyrolysis, in accordance with this further embodiment of the invention, nanostructure 811 consists of graphitic carbon nanoposts 812, where each nanopost 812 has a so-called "dirty tip", as shown in structure 805. The dirty tip is composed of photoresist decomposition products (primarily $SiO_2$, with some carbon included). The purpose of the coating is to introduce an electrical insulator such that electrowetting can be efficiently triggered.

Since, in accordance with this embodiment of the invention, the tip portions 813 of nanoposts 810 are intended to serve as the battery's dielectric, it will be important to remove any carbon layer on such tips 813 which may have resulted from the pyrolysis of the applied films. As will be appreciated, this particular carbon layer on tips 813 is an undesirable by-product of the pyrolysis in that it will adversely affect the conductive properties of tips 813. As such, in accordance with this embodiment, oxidation (see, FIG. 5, block 550) is applied to remove the unwanted carbon layer from tips 813 which results, as shown in structure 806, in the desired graphitic nanostructure 814 consisting of a plurality of graphitic nanoposts 812 which have dielectric tips 813. As will be appreciated, other well understood variations in processing/material selection will also provide the desired graphitic nanostructure 814 having graphitic nanoposts. For example, rather than using a select photoresist material to form the dielectric, an additional film layer could be applied on top of the polymer film (e.g., film 807) to fabricate the desired dielectric. Such additional film layer could be $SiO_2$, $Si_3N_4$, or $Al_2O_3$ each of which exhibits good dielectric properties.

Figure 9A:
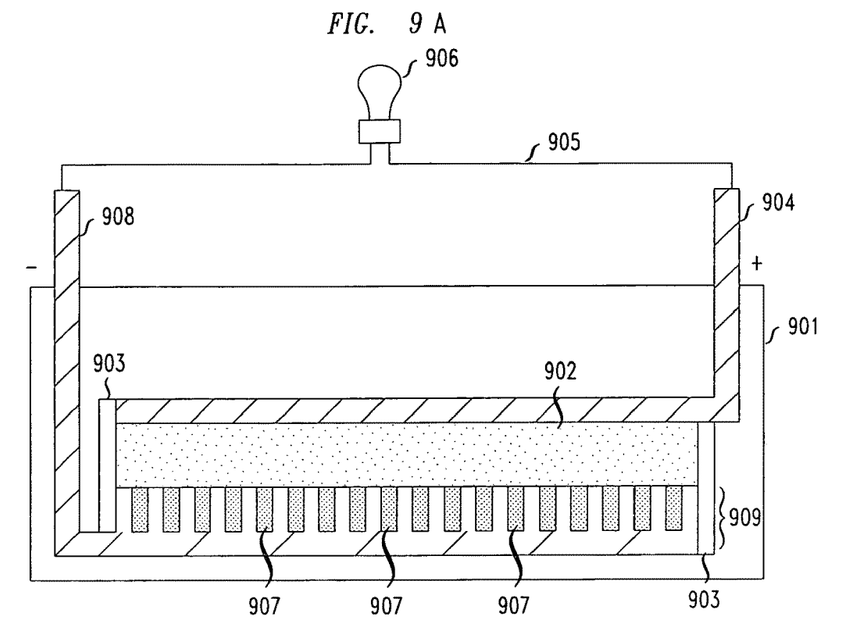
FIGS. 9A and 9B show an illustrative graphitic nanostructured lithium ion battery in accordance with the principles of the present invention.
Figure 9B:
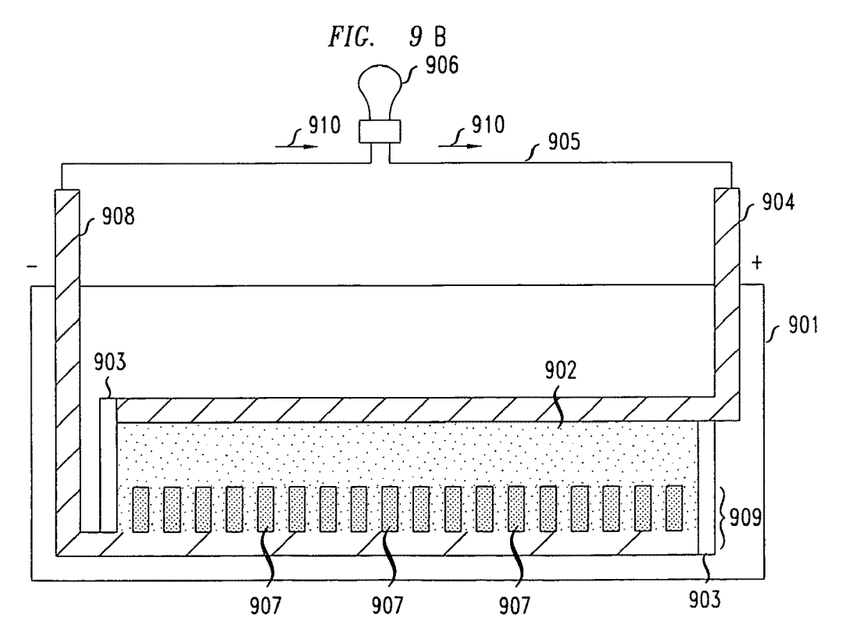

To further illustrate the principles of the present invention, an illustrative graphitic nanostructured lithium battery is shown in FIGS. 9A and 9B. More particularly, FIG. 9A shows an illustrative battery 901 in accordance with the principles of the present invention whereby an electrolyte fluid 902, i.e., an electrolyte fluid having lithium ions, is contained within a housing having containment walls 903. The electrolyte fluid 902 is in contact with positive electrode 904, but is separated from negative electrode 908 by graphitic nanostructured surface 907. As shown in FIG. 9A, graphitic nanostructured surface 909 also forms, in accordance with the principles of the invention, the negative electrode 908 of battery 901. In FIG. 9A, the electrolyte fluid is suspended on the tops of the graphitic nanoposts 907 of the surface 909, similar to the droplet of FIG. 5A. The battery 901 is inserted, for example, into electrical circuit 905 having load 906. When the electrolyte liquid is not in contact with negative electrode 905, there is substantially no reaction between the electrolyte and the electrodes 904 and 905 of the battery 901 and, therefore, there is no depletion of the materials of the electrodes. Thus, it is possible to store the battery 901 for relatively long periods of time without the battery becoming discharged.

FIG. 9B shows the battery 901 of FIG. 9A inserted into electrical circuit 905 wherein, utilizing the electrowetting principles described above, a voltage is applied to the graphitic nanostructured surface 909 (in particular, graphitic nanoposts 907) thus causing the electrolyte fluid 902 to penetrate the graphitic nanoposts 907 and to come into contact with the negative electrode 908. One skilled in the art will recognize that this voltage can be generated from any number of sources such as, for example, by passing one or more pulses of RF energy through battery 901. When the penetration of the electrolyte into the nanostructures occurs, electrons begin flowing in direction 910 along the circuit 905 as described above and the load 906 is powered. Thus, the illustrative embodiments of FIG. 9A and FIG. 9B show the graphitic nanostructures function to serve both as an operational feature and control feature of the battery itself, in accordance with the principles of the invention. That is, graphitic nanostructured battery 901 utilizes a graphitic nanostructure surface to form the battery's electrode (e.g., electrode 908) and to provide control feature thereto (e.g., how the battery can be stored without depletion for a relatively long period of time and can then be "turned on" at a desired point in time to power one or more electrical loads in an electrical circuit, or delivering a desired current or voltage from the battery).

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

We claim:

1. A battery, comprising:
   an electrolyte fluid; and
   a first electrode formed at least in part from a patterned plurality of nanostructured features on a substrate, the nanostructured features each including graphitic carbon, the electrolyte fluid being in contact with a surface formed by the patterned plurality of nanostructured features, and the electrolyte fluid being disposed between the first electrode and a second electrode;
   wherein the patterned plurality of nanostructured features, in addition to forming at least a part of the first electrode, enables controllable penetration of the electrolyte fluid through the surface and into contact with the substrate of the first electrode.

2. The battery of claim 1, wherein the patterned plurality of nanostructured features includes a plurality of nanostructured features each including graphitic turbostratic carbon.

3. The battery of claim 1, wherein the battery is configured for causing the electrolyte fluid to penetrate through the surface into the patterned plurality of nanostructured features and into contact with the substrate of the first electrode, upon applying a voltage between the first and second electrodes.

4. The battery of claim 3, wherein the electrolyte fluid is disposed in such a way between the first electrode and the second electrode so that upon causing the electrolyte fluid to penetrate through the surface and into contact with the substrate of the first electrode, the battery generates an electrical current.

5. The battery of claim 1, wherein each of the plurality of nanostructured features has a first portion and a second portion such that the first portion forms at least a part of the first electrode and the second portion enables the controllable penetration of the electrolyte fluid through the surface and into contact with the substrate of the first electrode.

6. The battery of claim 5, wherein the second portion of each of the patterned plurality of nanostructured features includes a dielectric material.

7. The battery of claim 1, wherein the electrolyte fluid includes lithium ions.

8. The battery of claim 6, wherein the dielectric material includes silicon dioxide, and wherein the first portion of each of the patterned plurality of nanostructured features includes graphitic carbon.

9. A method, comprising:
   providing a battery including an electrolyte fluid, a first electrode, and a second electrode, the first electrode being formed at least in part from a patterned plurality of nanostructured features on a substrate, the nanostructured features each including graphitic carbon, the electrolyte fluid being in contact with a surface formed by the patterned plurality of nanostructured features, and the electrolyte fluid being disposed between the first and second electrodes; and
   causing the patterned plurality of nanostructured features to enable controllable penetration of the electrolyte fluid through the surface and into contact with the substrate of the first electrode.

10. The method of claim 9, wherein causing the patterned plurality of nanostructured features to enable the controllable penetration of the electrolyte fluid through the surface and into contact with the substrate includes applying a voltage between the first and second electrodes and causing the electrolyte fluid to penetrate into the patterned plurality of nanostructured features.

11. The method of claim 9, wherein providing the battery includes providing the plurality of nanostructured features as each including graphitic turbostratic carbon.

12. The method of claim 9, wherein providing each of the plurality of nanostructured features includes providing a first portion of the nanostructured feature and a second portion of the nanostructured feature such that the first portion forms at least a part of the first electrode and such that the second portion enables the controllable penetration of the electrolyte fluid through the surface and into contact with the substrate.

13. The method of claim 12, wherein providing each of the plurality of nanostructured features includes providing the second portion as including a dielectric material.

14. A graphitic nanostructured surface for use in a battery comprising:
    a plurality of nanoposts formed from graphitic turbostratic carbon; and
    wherein said plurality of nanoposts function as a first electrode of said battery and provide a control for delivering a voltage or a current from said battery.

15. The graphitic nanostructured surface of claim 14 wherein said control provided by said plurality of nanoposts includes controlling a penetration of an electrolyte fluid in said plurality of nanoposts by passing a voltage over said plurality of nanoposts such that said electrolyte fluid penetrates said plurality of nanoposts, thus contacting said first electrode.

16. The graphitic nanostructured surface of claim 15 wherein each nanopost of said plurality of nanoposts has a first portion and second portion such that said first portion forms said first electrode and said second portion controls said contact of said electrolyte fluid and said first electrode.

17. The graphitic nanostructured surface of claim 16 wherein said first portion of said graphitic carbon nanopost is treated with a dielectric material.

18. The graphitic nanostructured surface of claim 15 wherein said electrolyte fluid contains lithium ions.

19. A battery, comprising:
- a substrate;
- a first electrode formed at least in part by a patterned plurality of nanostructured features;
- each of the plurality of nanostructured features including a conductive bottom portion being on the substrate, and a dielectric top portion being a dielectric tip of the nanostructured feature on the conductive bottom portion, the dielectric top portion being wholly located above the conductive bottom portion relative to the substrate; and
- an electrolyte fluid, being disposed between the first electrode and a second electrode, and being in contact with a surface formed by the dielectric tips;
- wherein the nanostructured features enable controllable penetration of the electrolyte fluid through the surface and into contact with the conductive bottom portions of the nanostructured features.

20. The battery of claim 19, wherein the dielectric top portion of each of the patterned plurality of nanostructured features includes $SiO_2$.

21. The battery of claim 19, wherein the conductive bottom portion of each of the patterned plurality of nanostructured features includes graphitic carbon.

22. The battery of claim 21, wherein the conductive bottom portion of each of the patterned plurality of nanostructured features includes graphitic turbostratic carbon.

23. The battery of claim 19, wherein the battery is configured for causing the electrolyte fluid to penetrate through the surface into the conductive bottom portions of the patterned plurality of nanostructured features upon applying a voltage between the first and second electrodes.

24. The battery of claim 23, wherein the electrolyte fluid is disposed in such a way between the first electrode and the second electrode so that upon causing the electrolyte fluid to penetrate through the surface and into contact with the conductive bottom portions of the patterned plurality of nanostructured features, the battery generates an electrical current.

25. The battery of claim 19, wherein each dielectric top portion includes a distal end located at a first distance away from the substrate, wherein each conductive bottom portion includes a lateral side extending over a second distance spanning most of the first distance, and wherein the lateral side is configured for contacting the electrolyte fluid throughout the second distance upon penetration of the electrolyte fluid into contact with the conductive bottom portions.

* * * * *